(12) United States Patent
Stringham

(10) Patent No.: US 8,918,606 B1
(45) Date of Patent: Dec. 23, 2014

(54) TECHNIQUES FOR PROVIDING INCREMENTAL BACKUPS

(75) Inventor: Russell Stringham, Orem, UT (US)

(73) Assignee: Symantec Corporation, Mountain View, CA (US)

( * ) Notice: Subject to any disclaimer, the term of this patent is extended or adjusted under 35 U.S.C. 154(b) by 690 days.

(21) Appl. No.: 12/434,319

(22) Filed: May 1, 2009

(51) Int. Cl.
  *G06F 12/00* (2006.01)
  *G06F 11/00* (2006.01)
  *G06F 17/00* (2006.01)
  *G06F 13/00* (2006.01)
  *G06F 13/28* (2006.01)

(52) U.S. Cl.
  USPC ........................................................ 711/162

(58) Field of Classification Search
  CPC .................... G06F 17/30575; G06F 17/30284; G06F 11/1451; G06F 11/1435
  USPC ........................................................ 711/162
  See application file for complete search history.

(56) References Cited

U.S. PATENT DOCUMENTS

| 5,835,953 | A  * | 11/1998 | Ohran ........................... 711/162 |
| 5,966,730 | A  * | 10/1999 | Zulch ............................ 711/162 |
| 6,981,114 | B1 * | 12/2005 | Wu et al. ....................... 711/162 |
| 7,472,242 | B1 * | 12/2008 | Deshmukh et al. ........... 711/162 |
| 7,797,279 | B1 * | 9/2010 | Starling et al. ................ 707/641 |
| 7,802,134 | B1 * | 9/2010 | Sobel et al. ..................... 714/15 |
| 2002/0112134 | A1 * | 8/2002 | Ohran et al. ................... 711/162 |
| 2002/0144068 | A1 * | 10/2002 | Ohran ............................ 711/161 |
| 2003/0101321 | A1 * | 5/2003 | Ohran ............................ 711/162 |
| 2003/0110190 | A1 * | 6/2003 | Achiwa et al. ................. 707/203 |
| 2005/0138312 | A1 * | 6/2005 | Kubo et al. .................... 711/162 |
| 2005/0240813 | A1 * | 10/2005 | Okada et al. .................... 714/14 |
| 2006/0069886 | A1 * | 3/2006 | Tulyani .......................... 711/161 |
| 2007/0168715 | A1 * | 7/2007 | Herz et al. ....................... 714/13 |

OTHER PUBLICATIONS

Unknown Author, Datasheet: Acronis True Image Echo Family Feature Guide, 14 pages, Jan. 2009.

* cited by examiner

*Primary Examiner* — Sheng-Jen Tsai
(74) *Attorney, Agent, or Firm* — Wilmer Cutler Pickering Hale and Dorr LLP

(57) ABSTRACT

Techniques for providing incremental backups are disclosed. In one particular exemplary embodiment, the techniques may be realized as a computer implemented method for providing incremental backup validation comprising setting one or more electronic storage indicators each indicating a respective allocated portion of electronic storage, setting one or more changed data indicators each indicating data changed in a respective allocated portion of the electronic storage since a prior backup, and comparing the one or more electronic storage indicators with the one or more changed data indicators to identify one or more allocated portions of the electronic storage containing data that is unchanged since the prior backup for backup validation.

14 Claims, 5 Drawing Sheets

TECHNIQUES FOR PROVIDING INCREMENTAL BACKUPS

FIELD OF THE DISCLOSURE

The present disclosure relates generally to system backup and, more particularly, to techniques for providing incremental backups.

BACKGROUND OF THE DISCLOSURE

Backup systems may use incremental backups which may back up only changed data since a last backup. This may require less time, less input/output (I/O) processing, and less storage than a full backup.

In a traditional backup strategy, a backup system may perform a full backup periodically, such as once a week, and may perform incremental backups at regular intervals between full backups. In the event a system restoration is desired (e.g., after a system crash), a backup system may restore the system to a desired recovery point using the most recent full backup, and any incremental backups that occurred after the full backup.

For systems relying on incremental backups, a backup chain (i.e., the number of backups required to restore a system) may get long if a full backup is not performed regularly. Thus, it is typically inefficient to rely exclusively on incremental backups.

However, some backup systems may create a synthetic full backup (i.e., a full backup generated from portions of several incremental backups) and thus may enable the use of incremental backups without using periodic full backups (e.g., "infinite incrementals"). Users of backup systems may prefer incremental backups and thus may use "infinite incrementals" or other backup strategies which may rely on incremental backups.

However, incremental backups may increase a risk of data integrity problems. That is, if a portion of a backup is corrupted or incorrectly captured, it may not be fixed by a later synthetic backup. For example, if one or more blocks are corrupted in an incremental backup and the one or more blocks are not changed again, subsequent incremental backups may not capture a new copy of the one or more corrupted blocks. Thus, these subsequent incremental backups that reference the one or more corrupted blocks may be corrupt as well. Even a synthetic full backup may not remedy this, because the one or more corrupted blocks of the prior incremental backup may be used for the generation of the synthetic full backup. Thus, the corruption may persist for an extended period of time and may have serious implications.

Furthermore, current restoration technologies for restoring a system using incremental backups may require restoring a long backup chain (i.e., a large number of backups to comprise a full set which may be necessary to restore a system). Not only is there risk of corruption in one or more portions of the incremental backup chain, but a long backup chain may increase the number of incremental backups to be processed by restoration system or process. Processing a larger number of incremental backups may take more system memory and a longer time.

In view of the foregoing, it may be understood that there may be significant problems and shortcomings associated with current system backup technologies.

SUMMARY OF THE DISCLOSURE

Techniques for providing incremental backups are disclosed. In one particular exemplary embodiment, the techniques may be realized as a computer implemented method for providing incremental backup validation comprising setting one or more electronic storage indicators each indicating a respective allocated portion of electronic storage, setting one or more changed data indicators each indicating data changed in a respective allocated portion of the electronic storage since a prior backup, and comparing the one or more electronic storage indicators with the one or more changed data indicators to identify one or more allocated portions of the electronic storage containing data that is unchanged since the prior backup for backup validation.

In accordance with other aspects of this particular exemplary embodiment, backup validation may comprise adding the one or more identified portions to an incremental backup.

In accordance with further aspects of this particular exemplary embodiment, backup validation may comprise comparing the one or more identified portions with one or more corresponding portions of backup data.

In accordance with additional aspects of this particular exemplary embodiment, backup validation may comprise identifying one or more inconsistencies as result of comparing the one or more identified portions with one or more corresponding portions of backup data, and adding data corresponding to the one or more identified inconsistencies to an incremental backup.

In accordance with additional aspects of this particular exemplary embodiment, the one or more identified portions of the unchanged, allocated portion of electronic storage for backup validation may comprise a specified percentage of unchanged, allocated electronic storage.

In accordance with additional aspects of this particular exemplary embodiment, identifying one or more portions of the unchanged, allocated portion of electronic storage for backup validation may further comprise selecting a least recently backed up portion of the unchanged, allocated portion of electronic storage.

In accordance with other aspects of this particular exemplary embodiment, backup validation may further comprise identifying the least recently backed up portion of the unchanged, allocated portion of electronic storage by comparing one or more prior backups with the identified, unchanged, allocated portion of electronic storage to determine a delta, whereby the delta comprises a portion of the identified, unchanged, allocated portion of electronic storage not contained on the one or more prior backups.

In accordance with further aspects of this particular exemplary embodiment, the one or more prior backups may be compared in reverse chronological order of a backup date with the identified, unchanged, allocated portion of electronic storage starting from a most recent backup and proceeding until the determined delta is a specified proportion of the identified, unchanged, allocated portion of electronic storage.

In accordance with additional aspects of this particular exemplary embodiment, the one or more electronic storage indicators may comprise at least one of: a bitmap, a run list, a range, and a data structure identifying one or more allocated portions of electronic storage.

In accordance with additional aspects of this particular exemplary embodiment, the techniques may be realized as at least one processor readable medium for storing a computer program of instructions configured to be readable by at least one processor for instructing the at least one processor to execute a computer process for performing the method.

In another particular exemplary embodiment, the techniques may be realized as a computer implemented method for providing incremental backup restoration comprising setting one or more allocated electronic storage indicators each indicating a respective allocated portion of electronic storage that is to be restored, comparing the one or more allocated electronic storage indicators with one or more prior backups in reverse chronological order of a backup date starting from a most recent backup and proceeding until all of the one or more allocated electronic storage indicators have been identified in the one or more prior backups, and restoring the one or more prior backups corresponding to the one or more allocated electronic storage indicators.

In yet another particular exemplary embodiment, the techniques may be realized as an article of manufacture for providing incremental backup validation, the article of manufacture comprising at least one processor readable medium; and instructions carried on the at least one medium, wherein the instructions are configured to be readable from the at least one medium by at least one processor and thereby cause the at least one processor to operate so as to set one or more electronic storage indicators each indicating a respective allocated portion of electronic storage, set one or more changed data indicators each indicating data changed in a respective allocated portion of the electronic storage since a prior backup, and compare the one or more electronic storage indicators with the one or more changed data indicators to identify one or more allocated portions of the electronic storage containing data that is unchanged since the prior backup for backup validation.

In still another particular exemplary embodiment, the techniques may be realized as a system providing incremental backup validation comprising one or more processors communicatively coupled to a network; wherein the one or more processors are configured to set one or more electronic storage indicators each indicating a respective allocated portion of electronic storage, set one or more changed data indicators each indicating data changed in a respective allocated portion of the electronic storage since a prior backup, and compare the one or more electronic storage indicators with the one or more changed data indicators to identify one or more allocated portions of the electronic storage containing data that is unchanged since the prior backup for backup validation.

In accordance with other aspects of this particular exemplary embodiment, the one or more processors may further be configured to add the one or more identified portions to an incremental backup.

In accordance with further aspects of this particular exemplary embodiment, the one or more processors may further be configured to compare the one or more identified portions with a corresponding portion of backup data.

In accordance with additional aspects of this particular exemplary embodiment, the one or more processors may further be configured to identify one or more inconsistencies as result of comparing the one or more identified portions with a corresponding portion of backup data, and add data corresponding to the one or more identified inconsistencies to an incremental backup.

In accordance with additional aspects of this particular exemplary embodiment, the one or more identified portions of the unchanged, allocated portion of electronic storage for backup validation may comprise a specified percentage of unchanged, allocated electronic storage.

In accordance with additional aspects of this particular exemplary embodiment, the one or more processors may further be configured to identify one or more portions of the unchanged, allocated portion of electronic storage for backup validation further by selecting a least recently backed up portion of the unchanged, allocated portion of electronic storage.

In accordance with additional aspects of this particular exemplary embodiment, the one or more processors may further be configured to identify the least recently backed up portion of the unchanged, allocated portion of electronic storage by comparing one or more prior backups with the identified, unchanged, allocated portion of electronic storage to determine a delta, whereby the delta comprises a portion of the identified, unchanged, allocated portion of electronic storage not contained on the one or more prior backups.

In accordance with additional aspects of this particular exemplary embodiment, the one or more processors may further be configured to identify the least recently backed up portion of the unchanged, allocated portion of electronic storage by comparing the one or more prior backups in reverse chronological order of a backup date with the identified, unchanged, allocated portion of electronic storage starting from a most recent backup and proceeding until the determined delta is a specified proportion of the identified, unchanged, allocated portion of electronic storage.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
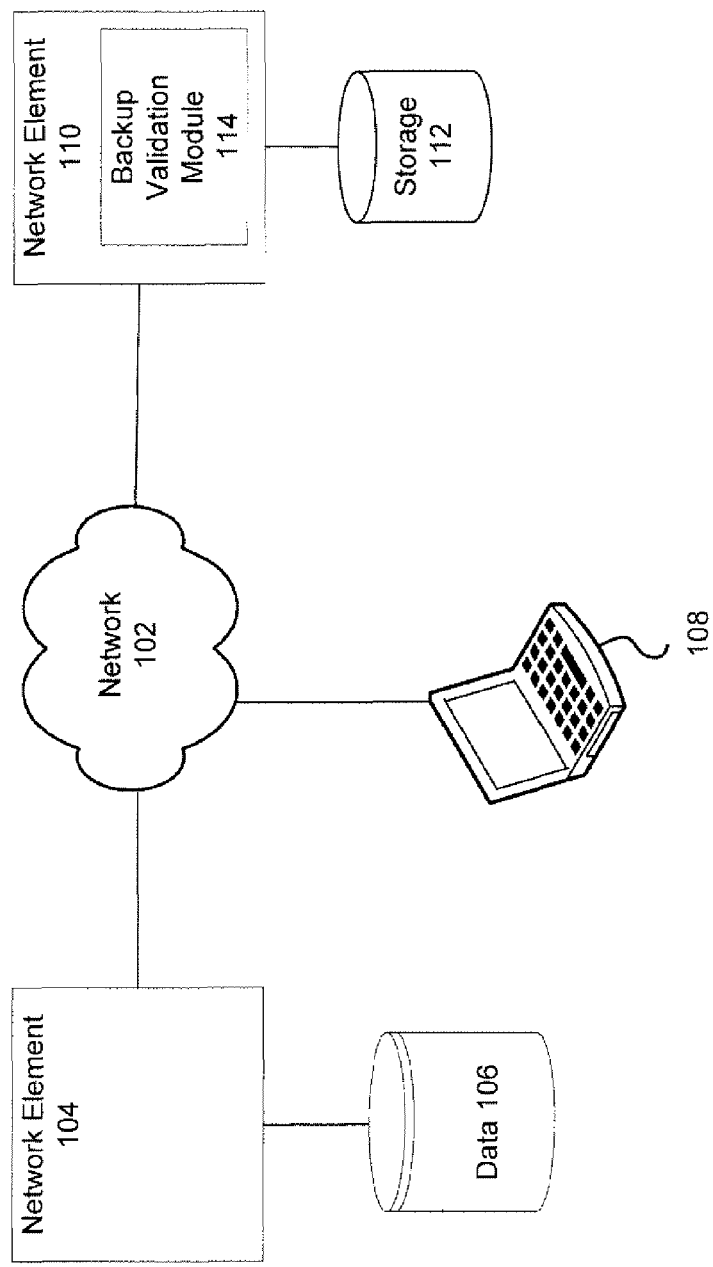
FIG. 1 shows a system for validating system backups in accordance with an embodiment of the present disclosure.

Referring to FIG. 1, there is shown a system 100 for providing incremental backups in accordance with an embodiment of the present disclosure. FIG. 1 is a simplified view of system 100, which may include additional elements that are not depicted. Network elements 104 and 110 may be communicatively coupled to network 102. Network element 110 may contain backup validation module 114. Computer 108 may be communicatively coupled to network 102. Data 106 may be communicatively coupled to network element 104. Storage 112 may be communicatively coupled to network element 110.

Network 102 may be a local area network (LAN), a wide area network (WAN), the Internet, a cellular network, a satellite network, or another network that permits communication between network elements 104 and 110, computer 108, and other devices communicatively coupled to network 102.

Network elements 104 and 110 may be application servers, backup servers, network storage devices, media servers, or other devices communicatively coupled to network 102. Network elements 104 and 110 may utilize storage 112 for the storage of application data, backup data, or other data.

Network elements 104 and 110 may be hosts, such as application servers, which may process data traveling between themselves and a backup device, a backup process, and/or storage.

Network element 110 may be a backup server attached to storage 112. In one or more embodiments, network element 110 may be capable of processing data received from or transmitted to storage 112. In other embodiments, network element 110 may represent a network appliance connected to a storage area network.

Computer 108 may be a desktop computer, a laptop computer, a server, or other computer. Computer 108 may receive data from user input, a database, a file, a web service, and/or an application programming interface. Computer 108 may query other systems and/or local or remote storage, such as data 110, network elements 104 and 110, and storage 112. Computer 108 may provide a user interface to the backup system 100.

Data 106 may be network accessible storage and may be local, remote, or a combination thereof to network elements 104 and 110. Data 106 may utilize a tape, disk, a storage area network (SAN), or other computer accessible storage. In one or more embodiments, data 106 may represent a database or another application instance.

In one or more embodiments, data in storage 112 may be images, such as snapshots or other file system block level backups. Network element 110 may be a backup server which may handle requests for backup data.

Network element 110 may contain backup validation module 114. Backup validation module 114 may improve incremental backup data integrity by one or more methods. Backup validation module 114 may identify additional allocated electronic storage, such as additional disk storage of a volume, to be added to an incremental backup. Backup validation module 114 may track allocated electronic storage which has not recently been modified and is not currently part of a backup. Backup validation module 114 may then separate this identified electronic storage into several increments and add an increment to each of several incremental backups. These added portions of identified electronic storage may be used to ensure that portions of electronic storage, which have not been backed up recently, are backed up so that an incremental backup chain (i.e., a number of incremental backups required to fully restore a system) does not get too long.

For example, if electronic storage comprises a volume containing one hundred gigabytes that has not been recently modified, these one hundred gigabytes may not be part of a traditional incremental backup strategy which may backup modified data. Adding one-hundred gigabytes to the incremental backup may cause the incremental backup to take longer than desired. Thus, in a traditional infinite incrementals backup strategy, a future restoration effort may rely on an older copy of the one-hundred gigabytes. Any corruption in the one-hundred gigabytes may jeopardize restoration efforts. Backup validation module 114 may add ten gigabytes of the one hundred to a daily incremental backup. By adding a different ten gigabytes each day, backup validation module 114 may ensure that the entire one hundred gigabytes is backed up in ten days without adding significant burden to an incremental backup strategy. Thus, the system of this example may be restored by going back no further than ten incremental backups. This may reduce the chance of data corruption and increase data integrity.

Backup validation module 114 may use added increments of various sizes depending on the size of identified, allocated electronic storage, a desired backup chain length, a permissible backup window or duration, and other factors. For example, backup validation module 114 may identify allocated electronic storage which has not been modified since a prior backup. Backup validation module 114 may divide identified, allocated electronic storage that has not been recently modified (i.e., identified, allocated electronic storage) into seven portions, twenty portions, or five portions, so that the identified allocated electronic storage may be backed up in seven days, twenty days, or five days, respectively. Other partitioning of identified allocated electronic storage is possible. Backup validation module 114 may prioritize portions of identified, allocated electronic storage. For example, backup validation module 114 may ensure that portions of electronic storage that have been least recently backed up are backed up first.

Backup validation module 114 may create a plurality of data structures to track allocated electronic storage or electronic storage which is part of an incremental backup, such as bitmaps, run lists (e.g., a data structure which may provide addresses of a first portion of allocated electronic storage and a length or number of units of allocated electronic storage), arrays, pointers, ranges, and other data structures for efficiently identifying used or allocated portions of electronic storage. Backup validation module 114 may use a first data structure to identify allocated electronic storage, which may be referred to as a "system map". A system map may contain a bit, a flag, or other indicator for every portion of allocated electronic storage, such as a bit set for every used or allocated block. Backup validation module 114 may use a second data structure to identify electronic storage in an incremental backup which may be referred to as an "incremental map." An incremental map may contain a bit, a flag, or other indicator for every portion of electronic storage in an incremental backup. Backup validation module 114 may compare a system map with an incremental map to identify allocated electronic storage that is not part of a current incremental backup. This identified allocated electronic storage may then be backed up by adding portions to one or more incremental backups. For example, backup validation module 114 may add five percent of the identified allocated electronic storage to a current incremental backup. Backup validation module 114 may add a different five percent of the identified allocated electronic storage to subsequent incremental backups. After twenty incremental backups, every portion of identified allocated electronic storage may be backed up.

In one or more embodiments, backup validation module 114 may prioritize portions of identified allocated electronic storage to backup. For example, backup validation module 114 may prioritize least recently used or modified portions of identified allocated electronic storage. This may reduce the number of incremental backups required to restore the system 100. Backup validation module 114 may use a copy of a system map and may unset every bit, flag, or indicator in the copy of the system map which corresponds to a current incremental backup. The remaining bits, flags, or indicators may indicate the allocated electronic storage not being backed up in the current incremental backup. Backup validation module 114 may then repeat the process by comparing the copy of the system map with an incremental map for a prior backup. The remaining bits, flags, or indicators on the copy of the system map may show the allocated electronic storage not in the current incremental backup or the prior incremental backup. The process may be continued by comparing the copy of the system map against the incremental maps of incremental backups in reverse chronological order of the incremental backup date. The process may continue until the desired percentage or size of allocated electronic storage remains on the copy of the system map (e.g., the five percent of allocated electronic storage which has least recently been backed up). Other factors may be considered including whether a portion of electronic storage is part of a file, ownership of a portion of electronic storage, a priority of data in a portion of electronic storage, a creation date associated with portion of electronic storage, a modification date associated with a portion of electronic storage, and an access date associated with a portion of electronic storage.

Additional factors may include detection of corruption or loss in a portion of electronic storage.

According to one or more embodiments, backup validation module 114 may compare identified allocated electronic storage which is not part of a current incremental backup with an earlier backup copy of the allocated electronic storage. Only if there is an inconsistency may the data from the identified allocated electronic storage be backed up. For example, specified percentage of identified allocated electronic storage which is not part of a current incremental backup may be compared with its earlier backup to detect inconsistencies and/or corruption. If there are inconsistencies and/or corruption, data from identified allocated storage may be added to a current incremental backup to be used in place of the inconsistent or corrupt data in a prior backup in any future restoration. If no inconsistencies or corruption are detected, no additional data may be added to the current incremental backup. Detection of inconsistent or corrupt data may prompt a user to check a larger percentage of allocated electronic storage. For example, detected corruption or inconsistencies may automatically trigger a comparison of all allocated or used electronic storage, a full backup, or other actions. In one or more embodiments, detection of data inconsistencies or corruption may trigger a prompt or notification to a user. A user may choose a desired response or may ignore the notification.

According to one or more embodiments, backup validation module 114 may enable a restoration process to detect an appropriate number of incremental backups and/or appropriate portions of incremental backups to use for a system restoration. A backup process may restore incremental backups in reverse chronological order of the backup date starting from the most recent incremental backup. The backup process may compare a system map with one or more incremental backup maps to determine how many incremental backups must be restored to restore every portion of data indicated in the system map.

Identifying only incremental backups required for a restoration process may improve restoration time and reduce required memory for a restoration process of a block based backup, a file based backup, or another backup scheme. Prior approaches may require opening all incremental backups in a backup chain until and including a base backup (i.e., a full backup or a synthetic full backup) is reached. According to one or more embodiments, backup validation module 114 may enable a restoration process to start with a most recent incremental backup to search for blocks, sectors, or other data portions that are requested as part of a restoration process. Backup validation module 114 may compare a system map identifying allocated storage of a system at a desired point in time of restoration with an incremental map identifying allocated storage in a most recent incremental backup. If the blocks, sectors, or other data portions are not contained in a most recent incremental backup, backup validation module 114 may compare a system map with an incremental backup map of a second most recent incremental backup. As described above, the number of incremental backups required to access all allocated data on a system may be significantly reduced by adding an additional portion of allocated data to one or more incremental backups. Thus, the number of incremental backups required to be open in memory for a backup process may be less. This may reduce memory requirements and decrease processing time. Additionally, backup validation module 114 may enable file based recovery using similar techniques. For example, backup validation module 114 may open one or more incremental backups as part of a restoration process. Backup validation module 114 may then provide access to the incremental backups as a logical drive and/or a logical device. An operating system, such as Microsoft Windows', may access the logical drive and may request one or more data portions such as a sector. Backup validation module 114 may receive the request and may search one or more incremental backup maps in reverse chronological order of backup date to identify the one or more requested data portions. The operating system may thus provide access to a file system contained in the incremental backups as it existed at a desired point in time and a user may access and recover one or more desired files.

Figure 2:
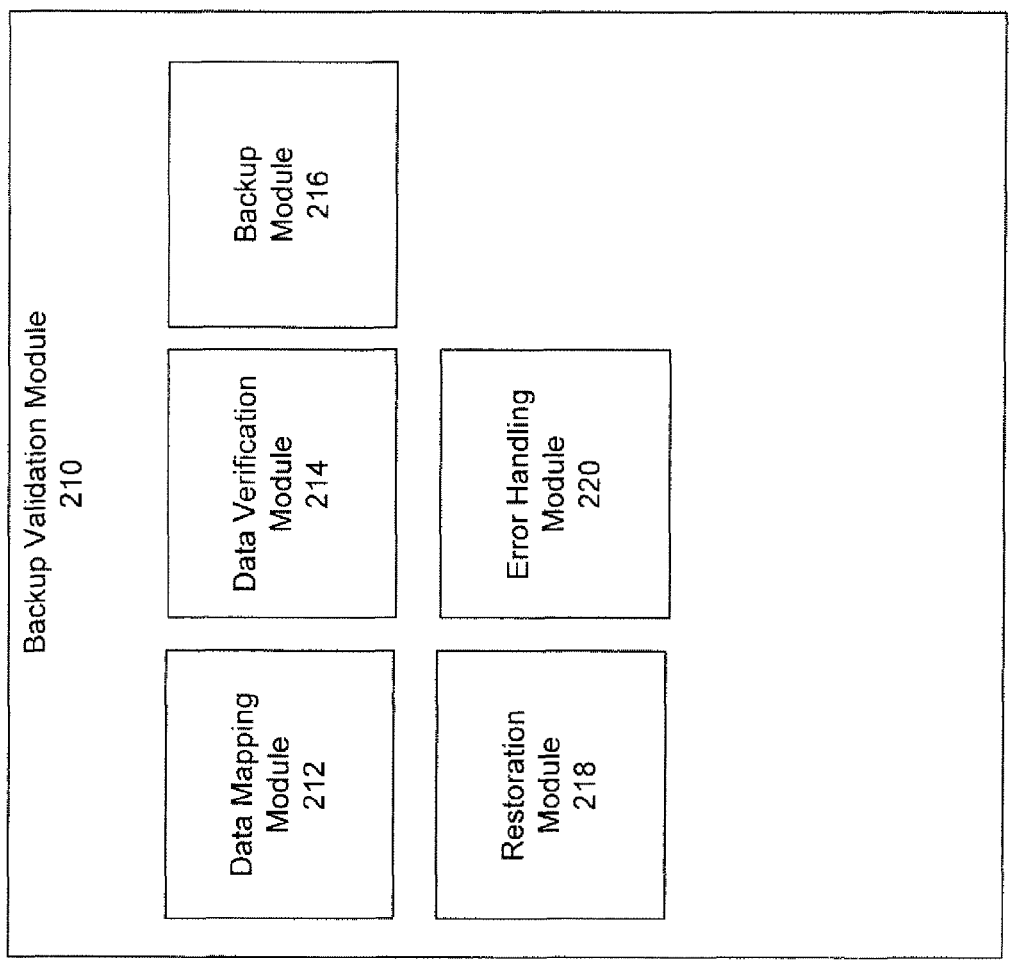
FIG. 2 shows a module for validating system backups in accordance with an embodiment of the present disclosure.

Referring to FIG. 2, there is shown a backup validation module 210 for providing system recovery in accordance with an embodiment of the present disclosure. As illustrated, the backup validation module 210 may contain one or more components including data mapping module 212, data verification module 214, backup module 216, restoration module 218, and error handling module 220.

Data mapping module 212 may enable the creation, modification, and deletion of one or more data structures to track allocated electronic storage or electronic storage which is part of an incremental backup, such as bitmaps, run lists (e.g., a data structure which may provide addresses of a first portion of allocated electronic storage and a length or number of units of allocated electronic storage), arrays, pointers, ranges, and other data structures for efficiently identifying used or allocated portions of electronic storage. Data mapping module 212 may use a first data structure to identify allocated electronic storage, which may be referred to as a "system map". A system map may contain a bit, a flag, or other indicator for every portion of allocated electronic storage, such as a bit set for every used or allocated block. Data mapping module 212 may use a second data structure to identify electronic storage in an incremental backup which may be referred to as an "incremental map." An incremental map may contain a bit, a flag, or other indicator for every portion of electronic storage in an incremental backup. Other data structures may be created and/or modified to track backups, recovery, electronic storage, corruption, or system related information.

Data verification module 214 may compare one or more maps or other data structures with electronic storage to verify data integrity. Data verification module 214 may verify a percentage of allocated electronic storage, a range of allocated electronic storage, and/or allocated electronic storage associated with one of a file, a user, a group, and/or an application. Upon detection of data inconsistencies or corruption, data verification module 214 may provide information associated with the inconsistencies to backup module 216, prompt a user, trigger further data verification, or perform other actions.

In one or more embodiments, data verification module 214 may add a specified percentage or amount of data of identified allocated electronic storage to an incremental backup. The data to be added may be identified by data verification module 214 as data least recently backed up. For example, data verification module 214 may compare a system map with one or more incremental maps to determine the five percent or ten percent of allocated electronic storage which has been least recently backed up.

Backup module 216 may enable an incremental or a full backup to be performed. In one or more embodiments, backup module 216 may perform incremental backups backing up data modified since a prior backup and a portion of identified allocated electronic storage. The portion of identified allocated electronic storage may be identified by data verification module 214.

Restoration module 218 may enable restoration of data after a system crash, outage, or other interruption. A user may desire to roll back the data or return the system to an earlier state (e.g., a software upgrade or installation may have been responsible for the crash and a restore may put back an earlier stable version.) Restoration module 218 may enable a restoration process to detect an appropriate number of incremental backups and/or appropriate portions of incremental backups to use for a system restoration. Restoration module 218 may restore incremental backups in reverse chronological order of a backup date starting from a most recent incremental backup. Restoration module 218 may compare a system map with one or more incremental backup maps to determine how many incremental backups must be restored to restore every portion of data indicated in the system map.

Identifying only incremental backups required for a restoration process may improve restoration time and reduce required memory for a restoration process of a block based backup, a file based backup, or another backup scheme. Prior approaches may require opening all incremental backups in a backup chain until and including a base backup (i.e., a full backup or a synthetic full backup) is reached. According to one or more embodiments, restoration module 218 may enable restoration process to start with a most recent incremental backup to search for blocks, sectors, or other data portions that are requested as part of a restoration process. Restoration module 218 may compare a system map identifying allocated storage of a system at a desired point in time of restoration with an incremental map identifying allocated storage in a most recent incremental backup. If the blocks, sectors, or other data portions are not contained in a most recent incremental backup, restoration module 218 may compare a system map with an incremental backup map of a second most recent incremental backup. As described above, the number of incremental backups required to access all allocated data on a system may be significantly reduced by adding an additional portion of allocated data to one or more incremental backups. Thus, the number of incremental backups required to be open in memory for a backup process may be less. This may reduce memory requirements and decrease processing time. Furthermore, this may decrease a risk of corruption or errors in a restoration process.

Additionally, restoration module 218 may enable file based recovery using similar techniques. For example, restoration module 218 may open one or more incremental backups as part of a restoration process. Restoration module 218 may then provide access to the incremental backups as a logical drive and/or a logical device. An operating system, such as Microsoft Windows™, may access the logical drive and may request one or more data portions, such as a sector. Restoration module 218 may receive the request and may search one or more incremental backup maps in reverse chronological order of backup date to identify the one or more requested data portions. The operating system may thus provide access to a file system contained in the incremental backups as it existed at a desired point in time and a user may access and recover one or more desired files.

Error handling module 220 may handle errors associated with backup, restoration, data verification, and other processes. Error handling module 220 may log errors, such as errors occurring during data verification, creation of a system map, a backup, a restoration, and other error related events. Error handling module 220 may provide prompts, reports, and/or user interfaces for handling errors.

Figure 3:
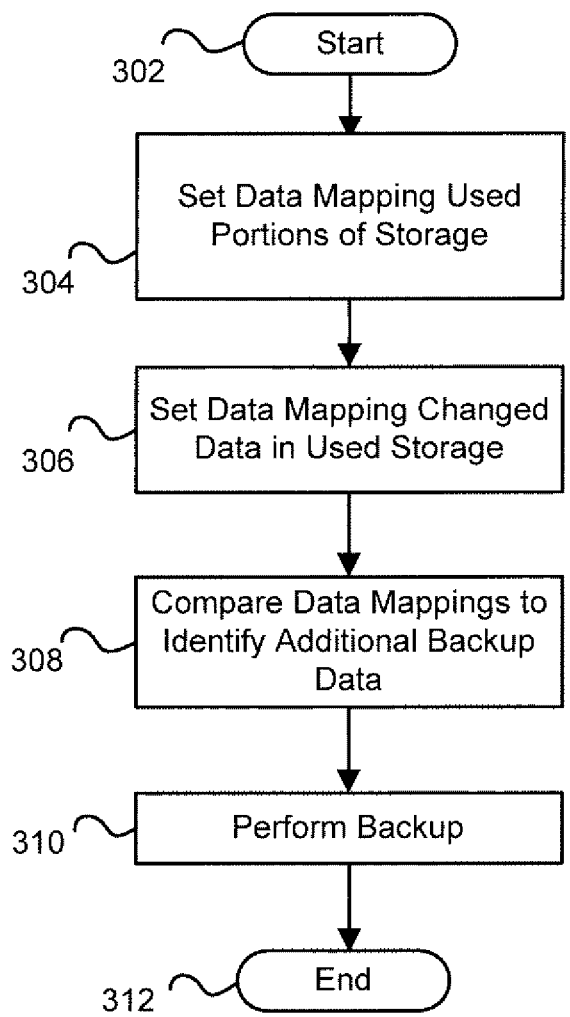
FIG. 3 depicts a method for validating system backups in accordance with an embodiment of the present disclosure.

Referring to FIG. 3, there is depicted a method 300 for validating system backups in accordance with an embodiment of the present disclosure. At block 302, the method 300 may begin.

At block 304, data mapping indicating allocated portions of electronic storage may be set. The data mapping may be a system map containing a bit, flag, or other indicator for every portion, such as a block, of allocated electronic storage.

At block 306, data mapping indicating allocated electronic storage contained in an incremental backup may be set. The data mapping may be an incremental map which may contain a bit, flag, or other indicator which may be set for every portion of electronic storage contained in an incremental backup.

At block 308, two or more data mappings may be compared, such as a system map and an incremental map. The comparison may identify a portion of allocated electronic storage not contained in one or more incremental backups. One or more parts of this portion may be verified and/or added to a current incremental backup.

At block 310, an incremental backup may be performed. In one or more embodiments, the incremental backup may contain a specified percentage of allocated electronic storage which has not been modified since a previous incremental backup. In one Or more embodiments, the specified percentage of allocated electronic storage which has not been modified since a previous incremental backup may be added to the incremental backup regardless of whether or not the data contained in the specified percentage has been verified against corresponding data in previous backups. In one or more embodiments, the data contained in the specified percentage may be added only if corruption or inconsistencies of corresponding data in earlier backups has been detected. In one or more embodiments, if corruption or inconsistencies of corresponding data in earlier backups has been detected, a full backup may be performed.

At block 312, the method 300 may end.

Figure 4:
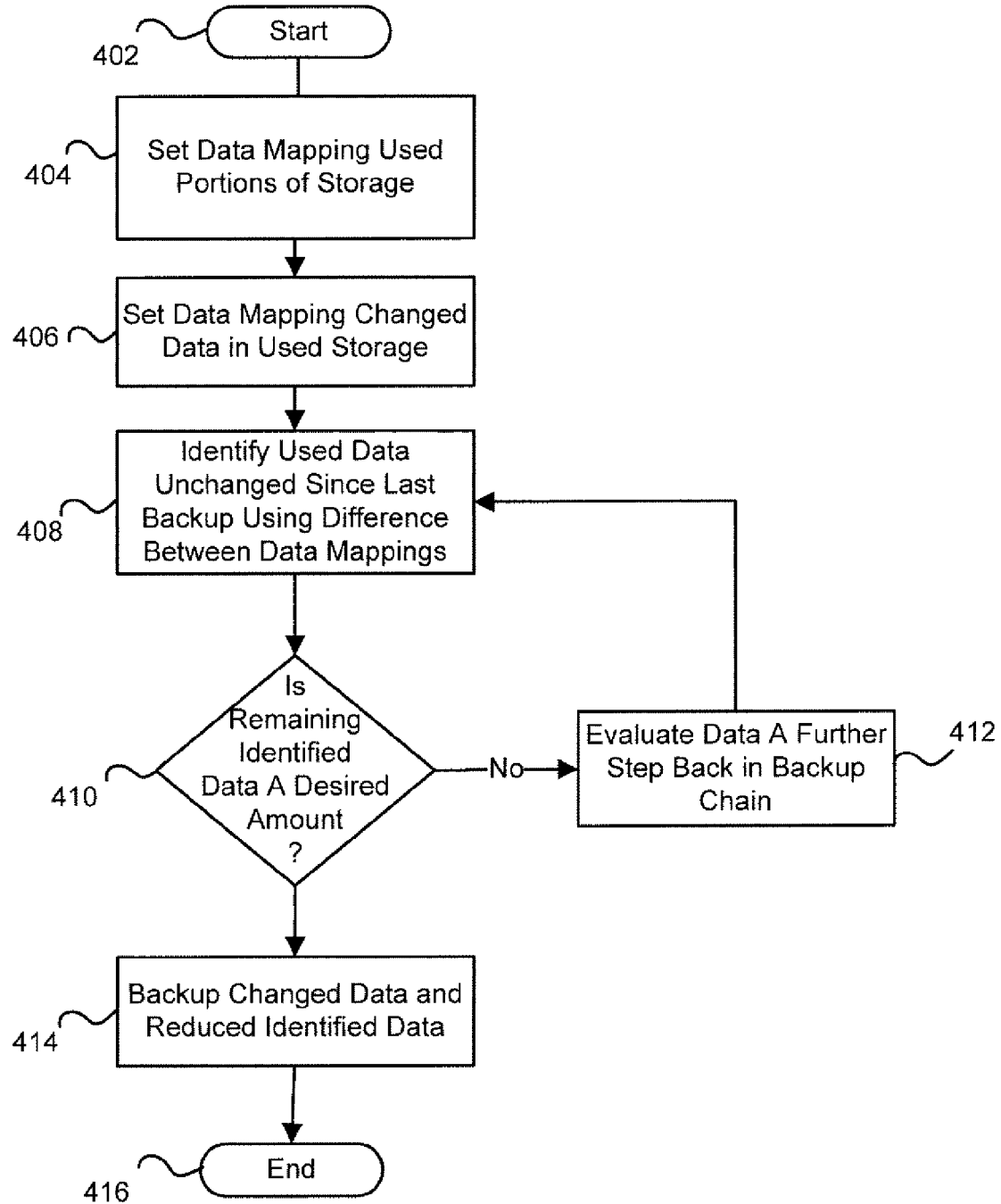
FIG. 4 depicts a method for validating system backups in accordance with an alternative embodiment of the present disclosure.

Referring to FIG. 4, there is depicted a method 400 for validating system backups in accordance with an alternative embodiment of the present disclosure. At block 402, the method 400 may begin.

At block 404, data mapping indicating allocated or used portions of electronic storage may be set. The data mapping may be a system map containing a bit, flag, or other indicator for every portion, such as a block, of allocated electronic storage.

At block 406, data mapping indicating allocated electronic storage contained in an incremental backup may be set. The data mapping may be an incremental map which may contain a bit, flag, or other indicator which may be set for every portion of electronic storage contained in an incremental backup.

At block 408, two or more data mappings may be compared, such as a copy of a system map and an incremental map. The comparison may identify a portion of allocated electronic storage not contained in one or more incremental backups. The indicators, flags, and/or bits set in the copy of the system map may be unset if they are contained in the incremental map.

At block 410, the method 400 may comprise determining whether the bits, flags, and/or indicators in the copy of the system map equal a specified percentage of identified allocated electronic storage. If the bits, flags, and/or indicators equal a specified percentage or amount of allocated electronic storage, the method 400 may continue at block 414. If the bits, flags, and/or indicators are more than a specified percentage or amount of allocated electronic storage, the method 400 may continue at block 412.

At block 412, the method 400 may comprise evaluating data of an earlier incremental backup. For example, an incremental map of a second most recent incremental backup may be created. This may be compared with the copy of the system map at block 408.

At block 414, the method 400 may comprise backing up data modified since a prior incremental backup as well as a portion of the data identified in block 408.

At block 416, the method 400 may end.

Figure 5:
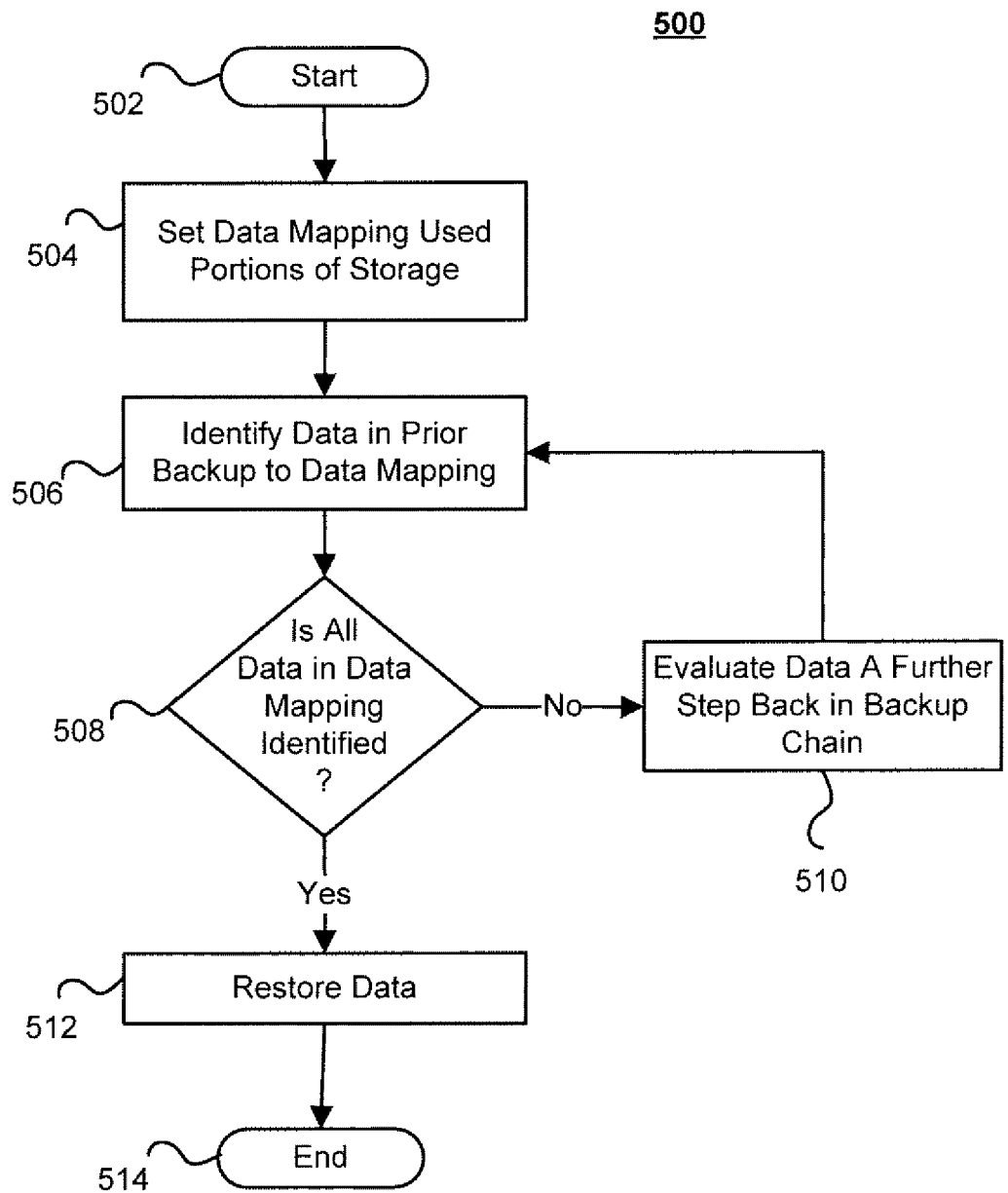
FIG. 5 depicts a method for restoring a system from incremental backups in accordance with an embodiment of the present disclosure.

Referring to FIG. 5, there is depicted a method 500 for restoring a system from incremental backups in accordance with an embodiment of the present disclosure. At block 502, the method 500 for providing an incremental backup may begin.

At block 504, data mapping indicating allocated portions of electronic storage may be set. The data mapping may be a system map containing a bit, flag, or other indicator for every portion, such as a block, of allocated electronic storage that is to be restored.

At block 506, data mapping indicating electronic storage contained in an incremental backup may be set. The data mapping may be an incremental map which may contain a bit, flag, or other indicator which may be set for every portion of electronic storage contained in an incremental backup.

At block 508, the method 500 may comprise comparing a copy of the system map with the incremental map, and unsetting one or more flags, bits, and/or identifiers in the copy of the system map which are also in the incremental map. If all flags, bits, and/or identifiers have been unset, the method 500 may continue at block 512. If not all flags, bits, and/or identifiers have been unset, the method 500 may continue at block 510. The method 500 may comprise tracking the incremental backups which are incremented in reverse chronological order of a backup date.

At block 510, the method 500 may comprise accessing an incremental backup which may be next in reverse chronological order of the backup date. The incremental map of this backup may be created at block 506.

At block 512, the method 500 may comprise restoring the backups tracked in step 508.

At block 514, the method 500 may end.

Identifying only incremental backups required for a restoration process may improve restoration time and reduce required memory for a restoration process of a block based backup, a file based backup, or another backup scheme. Prior approaches may require opening all incremental backups in a backup chain until and including a base backup (i.e., a full backup or a synthetic full backup) is reached. According to one or more embodiments, method 500 may comprise enabling a restoration process to start with a most recent incremental backup to search for blocks, sectors, or other data portions that are requested as part of a restoration process. Method 500 may comprise comparing a system map identifying allocated storage of a system at a desired point in time of restoration with an incremental map identifying allocated storage in a most recent incremental backup. If the blocks, sectors, or other data portions are not contained in a most recent incremental backup, method 500 may comprise comparing a system map with an incremental backup map of a second most recent incremental backup. As described above, the number of incremental backups required to access all allocated data on a system may be significantly reduced by adding an additional portion of allocated data to one or more incremental backups. Thus, the number of incremental backups required to be open in memory for a backup process may be less. This may reduce memory requirements and decrease processing time. Furthermore, this may decrease a risk of corruption or errors in a restoration process.

Additionally, method 500 may comprise enabling file based recovery using similar techniques. For example, method 500 may comprise opening one or more incremental backups as part of a restoration process. Method 500 may then comprise providing access to the incremental backups as a logical drive and/or a logical device. An operating system, such as Microsoft Windows', may access the logical drive and may request one or more data portions such as a sector. Method 500 may comprise receiving the request and may search one or more incremental backup maps in reverse chronological order of backup date to identify the one or more requested data portions. The operating system may thus provide access to a file system contained in the incremental backups as it existed at a desired point in time and a user may access and recover one or more desired files.

At this point it should be noted that providing incremental backups in accordance with the present disclosure as described above typically involves the processing of input data and the generation of output data to some extent. This input data processing and output data generation may be implemented in hardware or software. For example, specific electronic components may be employed in a module for providing incremental backups or similar or related circuitry for implementing the functions associated with providing incremental backups in accordance with the present disclosure as described above. Alternatively, one or more processors operating in accordance with instructions may implement the functions associated with providing incremental backups in accordance with the present disclosure as described above. If such is the case, it is within the scope of the present disclosure that such instructions may be stored on one or more processor readable media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A computer implemented method for providing incremental backup validation comprising:
   setting one or more electronic storage indicators each indicating a respective allocated portion of electronic storage for a system;
   setting one or more changed data indicators each indicating data changed in a respective allocated portion of the electronic storage for the system since a prior backup;
   comparing, using at least one computer processor, the one or more electronic storage indicators with the one or more changed data indicators to identify one or more allocated portions of the electronic storage of the system containing data that is unchanged since one or more prior incremental backups for backup validation, wherein identification of the one or more allocated portions of the electronic storage comprises prioritizing portions of unchanged data for backup, wherein identifying one or more portions of the unchanged, allocated portion of the electronic storage for backup validation further comprises selecting a least recently backed up portion of the unchanged, allocated portion of the electronic storage to reduce a number of incremental backups required to restore the system, wherein identifying the least recently backed up portion of the unchanged, allocated portion of the electronic storage comprises comparing the one or more prior incremental backups with the identified, unchanged, allocated portion of the electronic storage to determine a delta, whereby the delta comprises a portion of the identified, unchanged, allocated portion of the electronic storage not contained on the one or more prior incremental backups;
   adding the one or more identified unchanged portions to an incremental backup for the system, wherein the one or more identified unchanged portions added to the incremental backup comprise less than all of allocated portions of the electronic storage for the system containing data that is unchanged since the prior backup; and
   storing the incremental backup including the one or more identified unchanged portions.

2. The method of claim 1, wherein backup validation comprises comparing the one or more identified portions with one or more corresponding portions of backup data.

3. The method of claim 2, further comprising:
   identifying one or more inconsistencies as result of comparing the one or more identified portions with one or more corresponding portions of backup data; and
   adding data corresponding to the one or more identified inconsistencies to an incremental backup.

4. The method of claim 1, wherein the one or more identified portions of the unchanged, allocated portion of the electronic storage for backup validation comprises a specified percentage of unchanged, allocated electronic storage.

5. The method of claim 1, wherein the one or more prior incremental backups are compared in reverse chronological order of a backup date with the identified, unchanged, allocated portion of the electronic storage starting from a most recent incremental backup and proceeding until the determined delta is a specified proportion of the identified, unchanged, allocated portion of the electronic storage.

6. The method of claim 1, wherein the one or more prior incremental backups comprise at least one of: file based backups and block based backups.

7. The method of claim 1 wherein the one or more electronic storage indicators comprise at least one of: a bitmap, a run list, a range, and a data structure identifying one or more allocated portions of the electronic storage.

8. At least one non-transitory computer processor readable storage medium for storing a computer program of instructions configured to be readable by at least one computer processor for instructing the at least one computer processor to execute a computer process for performing the method as recited in claim 1.

9. An article of manufacture for providing incremental backup validation, the article of manufacture comprising:
   at least one non-transitory computer processor readable storage medium; and
   instructions carried on the at least one storage medium;
   wherein the instructions are configured to be readable from the at least one storage medium by at least one processor and thereby cause the at least one processor to operate so as to:
      set one or more electronic storage indicators each indicating a respective allocated portion of electronic storage for a system;
      set one or more changed data indicators each indicating data changed in a respective allocated portion of the electronic storage of the system since a prior backup;
      compare the one or more electronic storage indicators with the one or more changed data indicators to identify one or more allocated portions of the electronic storage of the system containing data that is unchanged since one or more prior incremental backups for backup validation, wherein identification of the one or more allocated portions of the electronic storage comprises prioritizing portions of unchanged data for backup, wherein identifying one or more portions of the unchanged, allocated portion of the electronic storage for backup validation further comprises selecting a least recently backed up portion of the unchanged, allocated portion of the electronic storage to reduce a number of incremental backups required to restore the system, wherein identifying the least recently backed UP portion of the unchanged, allocated portion of the electronic storage comprises comparing the one or more prior incremental backups with the identified, unchanged, allocated portion of the electronic storage to determine a delta, whereby the delta comprises a portion of the identified, unchanged, allocated portion of the electronic storage not contained on the one or more prior incremental backups;
      add the one or more identified unchanged portions to an incremental backup for the system, wherein the one or more identified unchanged portions added to the incremental backup comprise less than all of allocated portions of the electronic storage for the system containing data that is unchanged since the prior backup; and
      store the incremental backup including the one or more identified unchanged portions.

10. A system providing incremental backup validation comprising:
    one or more processors communicatively coupled to a network; wherein the one or more processors are configured to:
       set one or more electronic storage indicators each indicating a respective allocated portion of electronic storage for a system;
       set one or more changed data indicators each indicating data changed in a respective allocated portion of the electronic storage of the system since a prior backup;
       compare the one or more electronic storage indicators with the one or more changed data indicators to identify one or more allocated portions of the electronic storage of the system containing data that is unchanged since one or more prior incremental backups for backup validation, wherein identification of the one or more allocated portions of the electronic storage comprises prioritizing portions of unchanged data for backup, wherein identifying one or more portions of the unchanged, allocated portion of the electronic storage for backup validation further comprises selecting a least recently backed up portion of the unchanged, allocated portion of the electronic storage to reduce a number of incremental backups required to restore the system, wherein identifying the least recently backed UP portion of the unchanged, allocated portion of the electronic storage comprises comparing the one or more prior incremental backups with the identified, unchanged, allocated portion of the electronic storage to determine a delta, whereby the delta comprises a portion of the identified, unchanged, allocated portion of the electronic storage not contained on the one or more prior incremental backups;

add the one or more identified unchanged portions to an incremental backup for the system, wherein the one or more identified unchanged portions added to the incremental backup comprise less than all of allocated portions of the electronic storage for the system containing data that is unchanged since the prior backup; and store the incremental backup including the one or more identified unchanged portions.

11. The system of claim 10, wherein the one or more processors are further configured to:

compare the one or more identified portions with a corresponding portion of backup data.

12. The system of claim 11, wherein the one or more processors are further configured to:

identify one or more inconsistencies as result of comparing the one or more identified portions with a corresponding portion of backup data; and add data corresponding to the one or more identified inconsistencies to an incremental backup.

13. The system of claim 10, wherein the one or more identified portions of the unchanged, allocated portion of the electronic storage for backup validation comprise a specified percentage of unchanged, allocated electronic storage.

14. The system of claim 10, wherein the one or more processors are further configured to:

identify the least recently backed up portion of the unchanged, allocated portion of the electronic storage by comparing the one or more prior incremental backups in reverse chronological order of a backup date with the identified, unchanged, allocated portion of the electronic storage starting from a most recent incremental backup and proceeding until the determined delta is a specified proportion of the identified, unchanged, allocated portion of the electronic storage.

* * * * *